US008289438B2

(12) United States Patent
Yeh

(10) Patent No.: US 8,289,438 B2
(45) Date of Patent: Oct. 16, 2012

(54) USING DISTANCE/PROXIMITY INFORMATION WHEN APPLYING A POINT SPREAD FUNCTION IN A PORTABLE MEDIA DEVICE

(75) Inventor: Michael Victor Yeh, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 824 days.

(21) Appl. No.: 12/237,287

(22) Filed: Sep. 24, 2008

(65) Prior Publication Data

US 2010/0073518 A1    Mar. 25, 2010

(51) Int. Cl.
    *G03B 13/00*    (2006.01)
(52) U.S. Cl. .................... 348/345; 348/208.12
(58) Field of Classification Search .................. None
    See application file for complete search history.

(56) References Cited

U.S. PATENT DOCUMENTS

| 2003/0184663 | A1* | 10/2003 | Nakano et al. | 348/241 |
| 2007/0031057 | A1* | 2/2007 | Woo et al. | 382/255 |
| 2007/0268376 | A1* | 11/2007 | Yoshikawa et al. | 348/222.1 |
| 2008/0006762 | A1 | 1/2008 | Fadell et al. | |
| 2008/0074507 | A1* | 3/2008 | Ohara et al. | 348/222.1 |

OTHER PUBLICATIONS

"How does a digital camera combined auto focus work", ProsPhotos. com, Jan. 13, 2007, Internet article retrieved at: http://www.prosphotos.com/links/articles/article-48.html, (2 pages).
"Point Spread Function", Wikipedia, the free encyclopedia, Aug. 7, 2008, Internet retrieved from: http://en.wikipedia.org/wiki/Point_spread_function, (6 pages).

* cited by examiner

*Primary Examiner* — James Hannett
*Assistant Examiner* — Angel L Garces-Rivera
(74) *Attorney, Agent, or Firm* — Blakely, Sokoloff, Taylor & Zafman LLP

(57) ABSTRACT

An embodiment of the invention is directed to a relatively low cost technique for improving the sharpness or quality of digital images captured by a handheld portable media device. A housing of the device has integrated therein a digital camera image sensor, a camera lens, and a sensor that detects a distance measure, which is a measure of distance between the housing and an object or target in a scene that is before the lens. The device is programmed to select a point spread function, PSF, based on the detected distance measure. The selected PSF is then applied to de-blur the captured image, for becoming the final picture of the scene that is taken by the user. Other embodiments are also described and claimed.

27 Claims, 5 Drawing Sheets

USING DISTANCE/PROXIMITY INFORMATION WHEN APPLYING A POINT SPREAD FUNCTION IN A PORTABLE MEDIA DEVICE

An embodiment of the invention is generally related to portable handheld electronic devices, such as digital cameras and cellular telephone handsets that have built-in digital camera capability, and more particularly to techniques for improving the quality of images captured using such devices. Other embodiments are also described.

BACKGROUND

Portable handheld electronic devices such as cellular telephone handsets or smart phones that have built-in digital camera capability ("portable media devices") typically take pictures that are generally less sharp than those taken by more expensive and dedicated digital cameras. Image sharpness may be improved by focusing the optical image properly onto the image sensor that is part of the camera circuitry in the device. A moveable lens system, normally present in a higher end dedicated digital camera, can be used to achieve manual or automatic focusing. However, most smart phones lack such a feature since it tends to increase power consumption as well as result in additional bulk.

SUMMARY

An embodiment of the invention is directed to a relatively low cost technique for improving the sharpness or quality of digital images captured by a handheld portable media device. A housing of the device has integrated therein a digital camera image sensor, a camera lens, and a sensor that detects a distance measure, which is a measure of distance between the housing and an object or target in a scene that is before the lens. The device is programmed to select a point spread function, PSF, based on the detected distance measure. The selected PSF is then applied to de-blur the captured image, for becoming the final picture of the scene that is taken by the user. Other embodiments are also described.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

DETAILED DESCRIPTION

In this section several embodiments of this invention are explained with reference to the appended drawings. Whenever the shapes, relative positions and other aspects of the parts described in the embodiments are not clearly defined, the scope of the invention is not limited only to the parts shown, which are meant merely for the purpose of illustration.

In the following description, numerous specific details are set forth. However, it is understood that certain embodiments of the invention may be practiced without these specific details. In other instances, well-known circuits, structures, and techniques have not been shown to avoid obscuring an understanding of this description.

Figure 1:
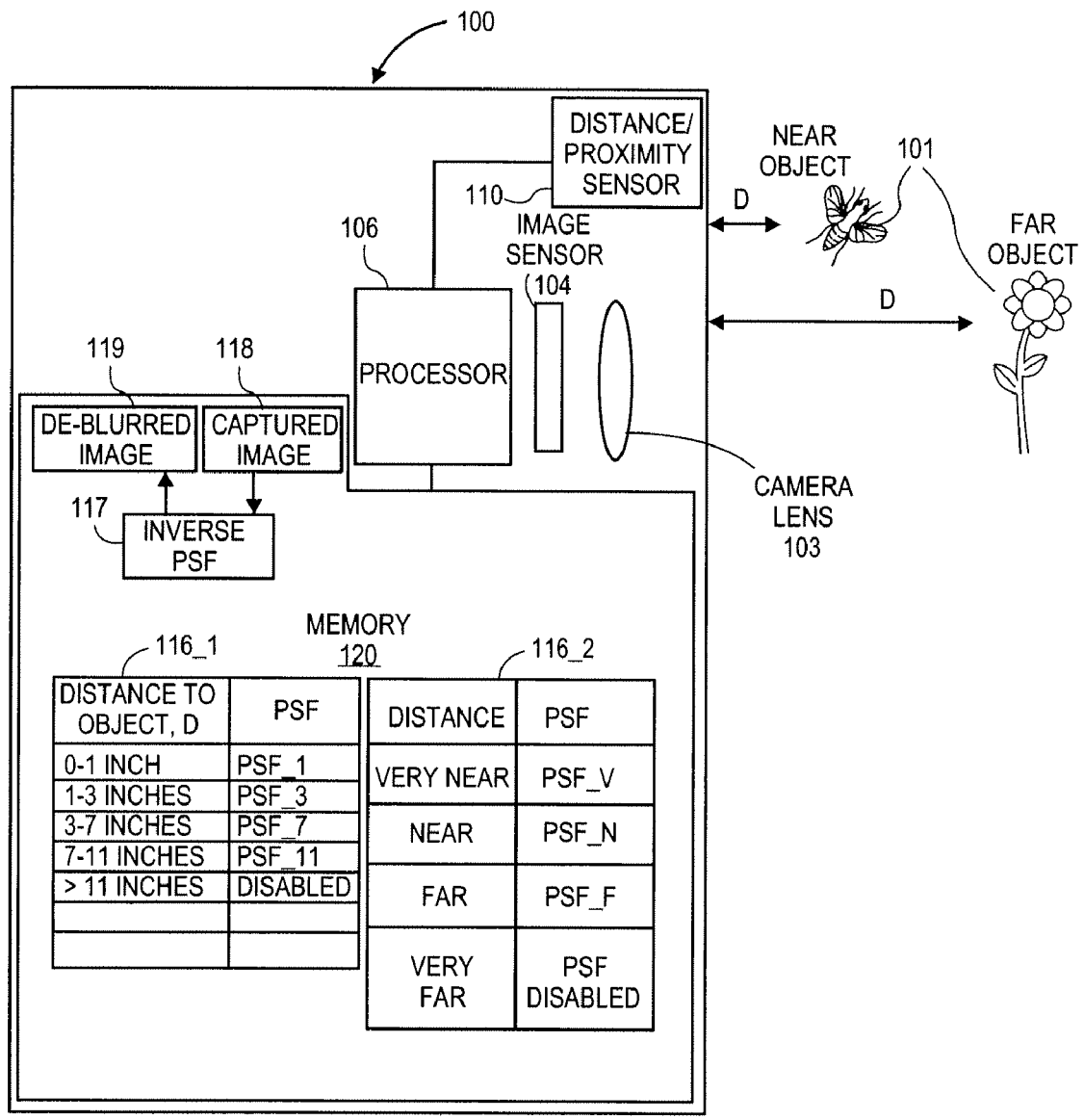
FIG. 1 shows a block diagram of a portable media device, in accordance with an embodiment of the invention.

FIG. 1 is a block diagram of an example portable media device 100 in which an embodiment of the invention may be implemented. The device 100 has a handheld media device housing (not shown) having integrated therein a number of components, as follows. A digital camera image sensor 104 (e.g., a solid state complementary metal oxide semiconductor, CMOS, type sensor or a charge coupled device, CCD, type sensor) is located at a focal plane relative to a camera lens 103. In a consumer grade digital camera or smart phone with digital camera capability, the camera lens 103 is part of a fixed, optical or lens system of the camera (i.e., no moveable optical focus or zoom capability). Such a system can form sufficiently sharp optical images on the sensor 104, of a scene that is before the lens. The scene may include a far object or target, depicted as a flower here, and/or a near object depicted as an insect (both referred to as object 101). The near object is at a shorter distance D than the far object, from the sensor 110 and the housing of the device 100. The image sensor 104 is able to capture a digital image of the scene including the one or more objects 101 that are before the lens 103. The captured image 118 may be stored in a memory 120 (e.g., solid state non-volatile random access memory). A processor 106 (e.g., an embedded, mobile applications processor) is coupled to the image sensor and the memory 120 to manage this image capture, and is also coupled to a distance/proximity sensor 110.

The sensor 110 is referred to as a proximity or distance sensor, because it detects a measure of the distance between the housing and an object 101 in the scene. The sensor 110 may include an emitter that generates light in the infrared band, that is directed at the scene before the lens 103. A portion of this emitted light, which has been scattered by the object 101, is reflected back toward and detected by the sensor 110. A small amount of reflected light may indicate that the object 101 is far, whereas a large amount of reflected light may indicate that the object 101 is near. The sensor 110 may have a detector to measure the intensity of such reflected light, which is related to the distance between the object 101, that has reflected the light, and the device housing. Other types of sensors for measuring distance or proximity of the target are possible, e.g. an ultrasonic sensor.

The sensor 110 may be capable of discriminating between two or more different, measured distance ranges. For example, in FIG. 1, the table 116_1 (stored in the memory 120) identifies five different distance ranges, D, that can be detected. Note that the identification of the distance ranges need not be based on any numerical distance values (quantitative), but rather may be qualitative. For example, the table 116_2 identifies four different detectable distance ranges as simply "very near", "near", "far", and "very far". Each of these defined ranges is associated with a given range of output data from the sensor 110. As explained below, the distance measure detected by the sensor 110 is used to select and then apply a given point spread function, PSF, to de-blur the captured image 118. This may be achieved by programming the processor 106 (to execute instructions stored in the memory 120, for example) to select or configure the PSF based on reading the output of the sensor 110 distance, and then apply an inverse of the PSF to the captured image as explained below, to undo the blurring effects of the PSF of the device's lens system.

The PSF describes the response of a lens system to a point source or point object. The lens system includes the camera lens 103 and perhaps other optical components such as filters and apertures that cooperate to result in the formation of an optical image on the image sensor 104. The PSF may also be referred to as the impulse response of the lens system. Ideally, the PSF is a delta function or impulse, which means that adjacent points in a target space have no overlap when imaged by the lens system. However, in practice, the PSF has a spatial profile, and adjacent points will have overlap when imaged. This results in image blurriness in the camera system. The PSF yields the degree of spreading or blurring of a point object, as a measure of the quality of the lens system. The PSF may be represented mathematically by a convolution equation.

An image that has been blurred due to the PSF may be recovered by inverting or reversing the effect of the PSF. By knowing the PSF of the lens system, a captured image may be de-blurred by applying an inverse of the PSF to the captured image, to restore or recover an "original" image, using deconvolution for example. This type of image processing, however, needs knowledge of the exact PSF profile of the lens system. Known mathematical constructs may be used to model the lens system, for example, using the concept of perfect point source objects.

The PSF of a conventional lens system typically varies as a function of distance of the lens to the object or target in the scene. This makes it difficult to use the PSF directly for de-blurring. Recent camera technologies overcome this limitation by designing custom optics that have a constant PSF over a wide range of target distances (so-called extended depth of field, EDOF). Since the PSF in that case is constant, a blurred scene with targets at multiple distances can be uniformly de-blurred with the known characteristic PSF. This technique, however, may introduce some artifacts into the de-blurred image, like an artificially wide depth-of-field and increased image noise (due to the PSF-inversion processing). Because such a lens system has a special PSF profile, the EDOF (and thus its imaging artifacts) cannot be easily removed or disabled.

A conventional fixed-focus camera system cannot focus an object close to the lens (e.g., within a few inches) without significant blurring. The exact PSF in that case is typically unknown at the time of image capture by the end user, because the distance to a target or object in the scene is unknown, and so the traditional PSF-inversion technique cannot be applied. However, if a proximity/distance sensor were paired or integrated with the camera system, a measure of the target distance can be calculated. This information may then be used by an image processor, which may have a pregenerated table of PSF vs. distance values for the lens. When the processor receives the distance measurement from the proximity sensor, it applies the proper PSF from the table for the PSF-inversion procedure, and may thus successfully de-blur the image without introducing significant artifacts. Thus, an object that is at a distance considered to be near the camera (close up), like a business card or bar code, can be imaged and then read by the user, even if it is physically out-of-focus. An advantage to this approach is that the camera system may disable the PSF-inversion mode, so that scenes in which the object is far from the camera (normal shots) will not suffer from the artifacts that are typically present with conventional PSF inversion procedures. Also, this technique does not require any special hardware except for a proximity sensor or other means of detecting distance to an object in the scene.

The application of a selected PSF to de-blur the captured image 118 is represented in FIG. 1 by block 117. This block refers to instructions or code and data stored in the memory 120 to be executed by the processor 106, working on the captured image 118 as input, to produce a de-blurred image 119 (that may also be stored in the memory 120). In practice, the selection of a PSF, from amongst a number of previously determined PSFs, may include, for example, setting variables or coefficients of a digital filter that implements the application of an inverse PSF to a captured image, in accordance with previously predetermined "PSF values" that may in part define the selected PSF.

The PSF values in the table 116 may have been experimentally determined in the laboratory for an actual specimen of the device 100. This specimen should have the same optical system (e.g., camera lens 103, aperture, filter, and other aspects of the optical path to image sensor 104) as that which will be used in production versions of the device 100. Thus, referring to FIG. 1, the experimental work in the laboratory, done to populate the table 116, may involve the following operations: produce a point-like radiating source at a defined distance from the optical system, capture an image of such a source using the image sensor 104, and analyze the captured image to derive values representing the PSF at that distance. This operation may be repeated at various distances as shown in the table 116, to compute the respective PSF parameters or values at each distance. The populated table 116 is then stored in each instance of the production version of the device 100. Thereafter, while the device 100 is in use by its purchaser (consumer or end user), the processor 106 will execute further instructions stored in the memory 120 that select a PSF by making a reference to the table 116, using a detected distance measure, D, taken by the sensor 110. The table 116 may be one that comprises quantitative distance ranges (table 116_1), or it may be a table that comprises qualitative distance ranges (table 116_2), together with their respective PSF parameters or values.

In another embodiment of the invention, rather than refer to a table 116 with more than two different PSF definitions, the inverse PSF block 117 may be controlled simply as an on or off function. In that case, the memory 120 would store instructions that when executed by the processor 106 would, on the one hand, enable application of the PSF (enable inverse PSF block 117) to de-blur the captured image 118 when the distance/proximity sensor 110 indicates the object is near, and on the other hand disable it when the distance/proximity sensor indicates the object is far. For example, when the object is near, a macro mode of operation (for the camera application) is enabled in which the PSF correction process is applied to all pictures being taken in that mode; when the object is far, macro mode is disabled.

Figure 2:
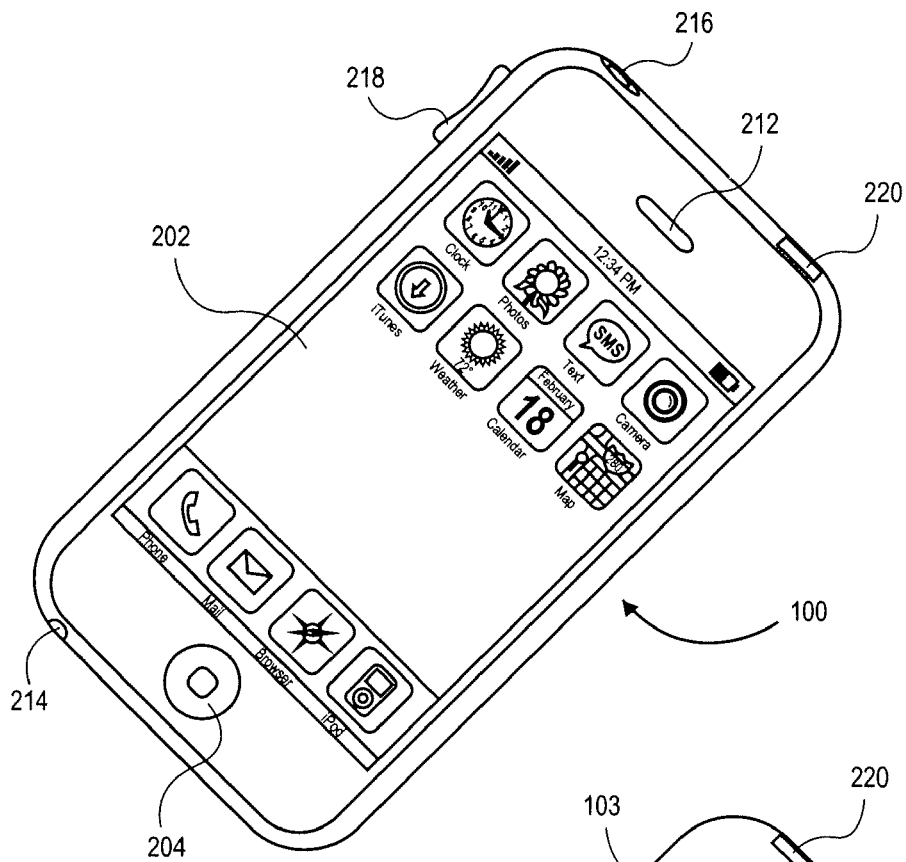
FIG. 2 depicts a front view of the outside of the housing of an example smart phone device or portable media device.
Figure 3:
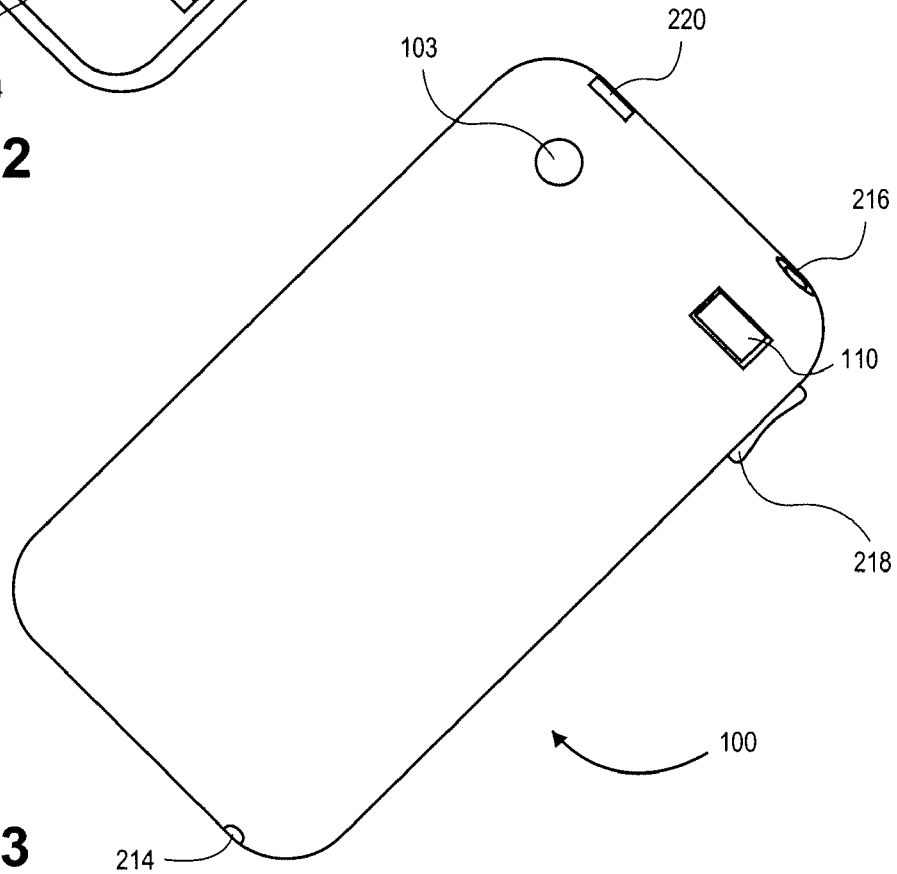
FIG. 3 is a view of the rear face of the smart phone device of FIG. 2.

The above-described capability for improving sharpness of an image captured by a portable media device may be implemented in the example smart phone or portable media device 100 depicted in FIGS. 2-4 and 6. The device 100 has a housing in which is integrated a display screen 202 on its front face, while the camera lens 103 is aimed out of the rear face (FIG. 3). Similarly, the distance/proximity sensor 110 is positioned so that it is aimed outward from the rear face. In addition to camera functions, the device 100 has a number of other functions as described below.

Figure 4:
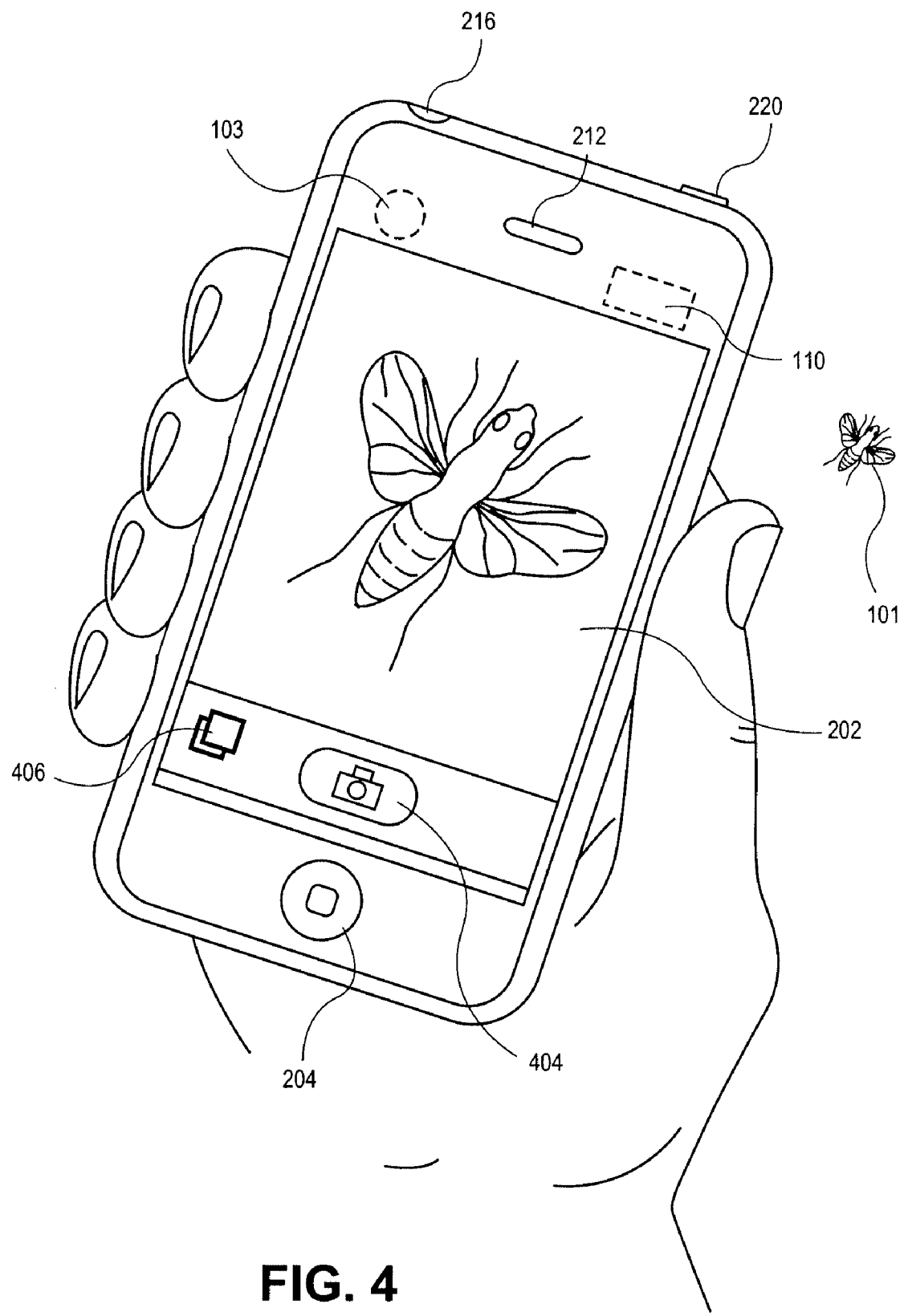
FIG. 4 shows the smart phone device of FIG. 2 running a camera application in which a viewfinder function is showing an object in a scene at which a camera lens of the device is aimed by the user.
Figure 6:
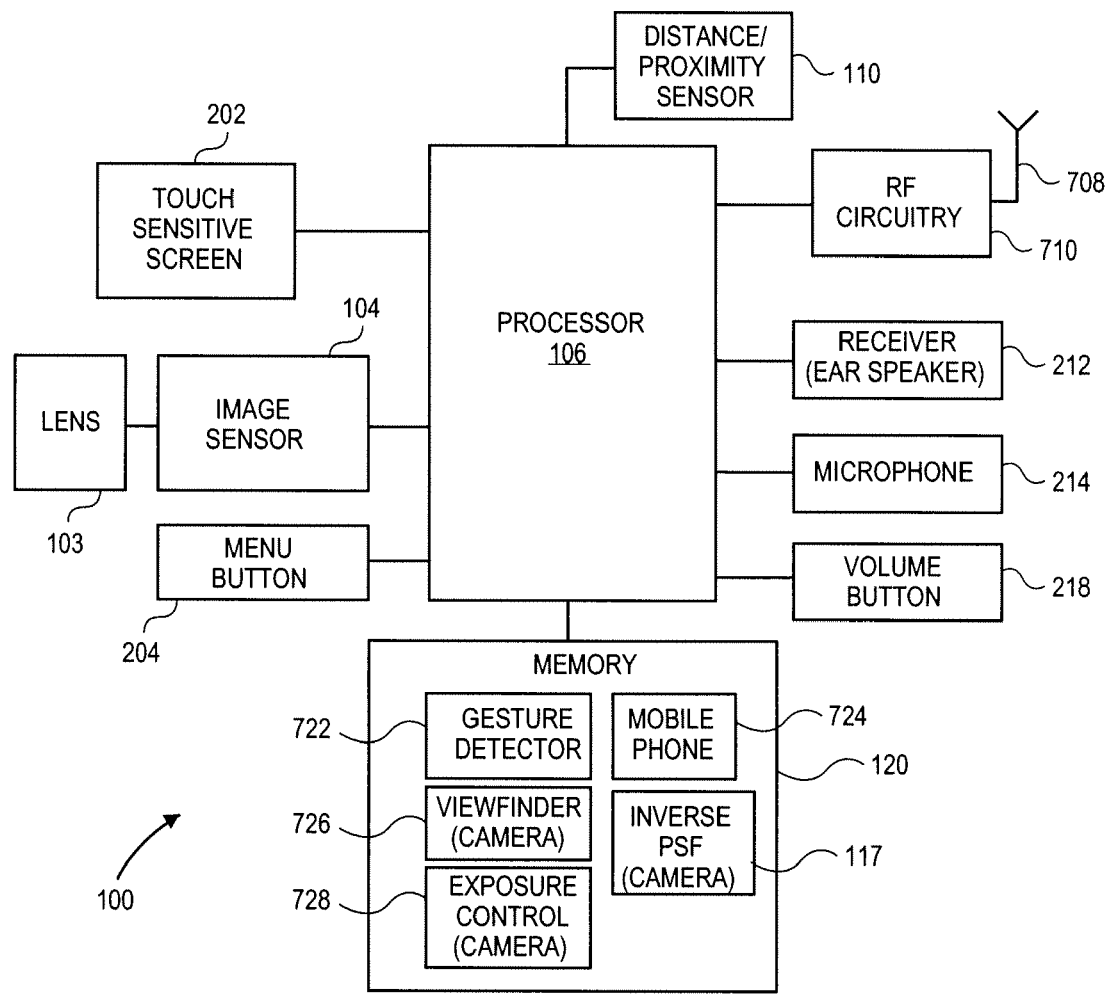
FIG. 6 is a more detailed block diagram of a smart phone device.

Referring now to FIGS. 2-4 and the block diagram of FIG. 6, in this example, the portable media device 100 includes a touch screen within the display screen 202 (referred to here as a touch sensitive screen 202.) Thus, in addition to one or more physical buttons that will be described below, the device 100 also contains virtual buttons (on the touch screen). To detect finger touch gestures on the touch sensitive screen 202 and associate them with particular buttons or user interface objects that are displayed on the screen 202, a gesture detection module 722 stored in the memory may be executed by the processor 106.

In this example, the button 204 is a physical button that when actuated by the user brings a graphical user interface of the device to its home or main menu, as shown in the front view of FIG. 2. The home menu has a launch icon for a number of applications or widgets, an example of which is shown in FIG. 2. These may include a web browser, email, wireless telephony, and a digital music or video player. The camera application, once launched by the user, enables a viewfinder to appear on the touch screen 202, together with a virtual shutter button 404 and an image library icon 406, which allow the user to control various camera functions. As seen in FIG. 4, the user may hold the device 100 in his hand and aim the lens 103 towards a scene in which there is an object 101 whose picture is to be taken. The user can preview the picture using the electronic viewfinder operating through the touch screen 202 as shown. The user can then take the picture by touching the virtual shutter button icon 404.

The device 100 may also include input/output components such as ports and jacks or connectors. For example, referring now to FIGS. 2 and 3, a microphone 214 and its associated opening is located at a bottom end portion of the housing, while an earpiece speaker or receiver 212 and its associated opening is located at a top end portion of the housing. The user hears the voice of another participant to a telephone call, emitted through the opening associated with the receiver 212, which is placed adjacent to the user's ear during the call. Simultaneously, the user's speech is captured through the opening of the microphone 214 and transmitted to the other participants. The device 100 may include a headset jack 216 and/or a wireless headset interface (not shown), to connect with a headset device worn by the user. The device 100 also has a physical volume control button 218 that lets the user increase or decrease the volume of sound emitted by the receiver 212 or through a connected headset.

Referring now to FIG. 6, the detailed block diagram of the device 100 in this case reveals the presence of RF circuitry 710 connected to an antenna 708, which enables wireless telephony calls (voice only or voice and video) to be made and received. The RF circuitry 710 and associated antenna 708 may be designed in accordance with any one of several available wireless communications network protocols and may allow the user to conduct a call using one of several different call protocols. These may be, for example, a cellular mobile phone network (e.g., a global system for mobile communications, GSM, network, including current 2G and 3G, as well as future 4G networks), or an IEEE 802.11 network (WiFi or wireless local area network, WLAN), where the latter may support wireless voice over Internet protocol (VOIP.) To manage the making and receiving of such wireless calls, the processor 106 executes instructions that are part of a mobile phone module 724 stored in the memory.

FIG. 4 shows the device 100 running the camera application, where a viewfinder function is showing the object 101 on the screen 202. The camera lens 103 and the proximity/distance sensor 110 are aimed at the object 101 as shown. Note the virtual shutter button icon 404, which is present at the bottom end portion of the screen 202. A flow diagram of operations performed by the camera application of such device 100 is depicted in FIG. 5.

Figure 5:
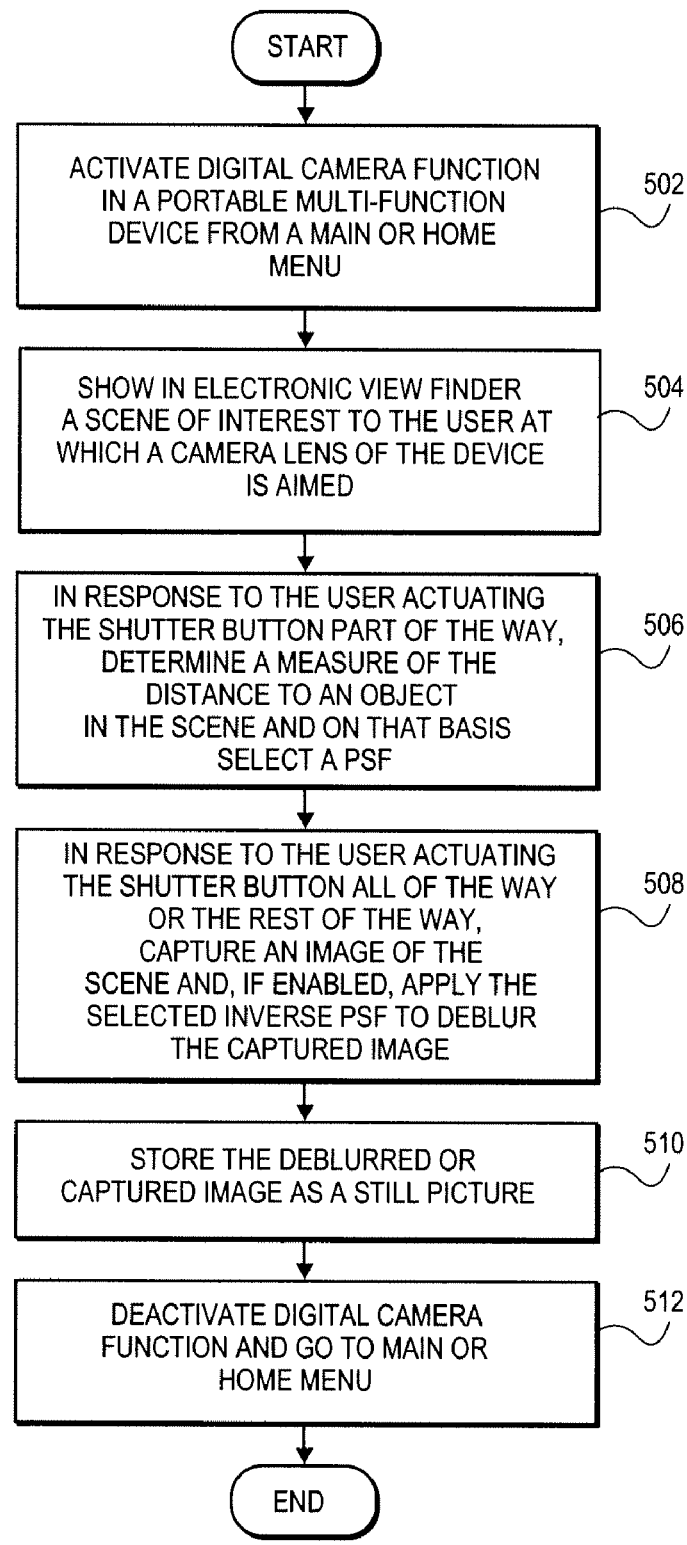
FIG. 5 is a flow diagram of operations performed by a camera application of a smart phone device.

In FIG. 5, operation may begin with activation of a digital camera function in the device 100, from a main or home menu (block 502). Software running in the device 100 may thus respond to the user touching the camera icon shown in the main menu, in the screen 202 (see FIG. 2). The software modules that may be executing at this point include the viewfinder module 726, the exposure control module 728, and the gesture detector 722 as depicted in FIG. 6. In this manner, an electronic viewfinder shows to the user a scene of interest at which the camera lens 103 of the device is aimed (block 504), as for example, depicted in FIG. 4. Next, in response to the user actuating the shutter button part of the way (e.g., touching and holding her finger on the virtual shutter button icon 404, the camera application determines a measure of the distance to an object in the scene and, on that basis, selects a PSF (block 506). In this case, the lens system of the camera does not have a constant PSF but rather has a PSF that varies depending on the distance to the target or object in the scene. The camera selects one of several previously stored PSFs, namely the one for which the target is at the determined or detected distance range. In digital image processing, this selection may involve, for example, setting coefficients of a digital filter that applies an inverse of a given PSF, to a captured image (inverse PSF module or block 117).

In one embodiment, the captured image may be obtained by the procedure described in bock 508, namely, in response to the user actuating the shutter button all of the way or the rest of the way. In the case of a virtual shutter button, the button can be considered to be actuated all of the way or the rest of the way when the user has lifted her finger off the shutter button icon 404 being displayed by the screen 202. If de-blurring by PSF inversion has been enabled, then the selected, inverse PSF is applied to de-blur the just captured image (block 508). Additional image processing operations such as de-noising and white balance may be performed upon the de-blurred image, either before applying PSF inversion or after. The de-blurred image may then be stored in the device 100 as the final still picture or shot, taken by the user (block 510.) After one or more desired pictures or shots have been taken in this manner, the user may deactivate the camera function, thereby returning the device 100 to its main or home menu (block 512.)

To conclude, various aspects of an image processing methodology that may be implemented in portable or mobile media devices have been described. As explained above, an embodiment of the invention may be a machine-readable medium having stored thereon instructions which program a processor to perform some of the operations described above. In other embodiments, some of these operations might be performed by specific hardware components that contain hardwired logic. Those operations might alternatively be performed by any combination of programmed data processing components and custom hardware components. A machine-readable medium may include any mechanism for storing information in a form readable by a machine, such as Compact Disc Read-Only Memory (CD-ROMs), Read-Only Memory (ROMs), Random Access Memory (RAM), Erasable Programmable Read-Only Memory (EPROM).

Also, a particular function that is obtained or performed by a programmed processor may actually be implemented as two or more pieces of separate software that are being executed by different hardware units which logically are deemed a part of the processor. For example, the processor 106 described above may be viewed as a logical processor that comprises multiple, different processing components each of which may be accessing a separate part of memory for the instructions it is executing.

The invention is not limited to the specific embodiments described above. For example, although FIGS. 2-4 and 6 describe a particular type of smart phone device in which the handset housing has a chocolate bar shape with a touch screen, the invention may be implemented in devices whose housings are shaped differently and that do not have a touch screen, e.g. clam shell type devices having a display screen in one segment and a physical keyboard or telephone keypad in the other. Accordingly, other embodiments are within the scope of the claims.

What is claimed is:

1. A portable media device comprising:
a handheld media device housing having integrated therein a digital camera image sensor,
a camera lens to form on the image sensor an optical image of a scene that is before the lens, the image sensor to capture an image of the scene,
a distance/proximity sensor to detect a distance measure, being a measure of distance between the housing and an object in the scene,
a processor coupled to the image sensor and the proximity sensor, and
a memory coupled to the processor, wherein the memory stores instructions that when executed by the processor a) enable application of a point spread function, PSF, when the distance/proximity sensor indicates the object is near, b) disable the PSF when the distance/proximity sensor indicates the object is far, and c) apply the PSF to de-blur the captured image if the PSF is enabled.

2. The portable media device of claim 1 wherein the memory stores a table of distance measures and their respective PSF values, and wherein the memory stores further instructions that when executed by the processor select the PSF by referring to the table using the detected distance measure.

3. The portable media device of claim 2 wherein the detected distance measure isquantitative.

4. The portable media device of claim 2 wherein the detected distance measure is qualitative.

5. The portable media device of claim 2 wherein the table comprises quantitative distance ranges and their respective PSF values.

6. The portable media device of claim 2 wherein the table comprises qualitative distance ranges and their respective PSF values.

7. The portable media device of claim 1 wherein the memory stores further instructions that when executed by the processor display captured images of the scene via an electronic viewfinder to a user, while the scene is being displayed, respond to the user's actuation of a shutter button part-of-the-way by obtaining the detected distance measure, and then respond to the user's actuation of the shutter button all-of-the-way by selecting the PSF based on the detected distance measure and applying the selected PSF to deblur the captured image.

8. The portable media device of claim 1 wherein the memory stores further instructions that when executed by the processor, select the PSF from a plurality previously stored PSFs, based on the detected distance measure.

9. A machine-implemented method for operating a digital camera, comprising:
detecting a distance measure being a measure of distance between the camera and an object in a scene that is before the camera;
capturing an image of the scene including the object;
enabling a point spread function, PSF, if the detected distance measure indicates the object is near;
disabling the PSF if the detected distance measure indicates the object is far; and
applying the PSF to the captured image if the PSF is enabled.

10. The machine-implemented method of claim 9 further comprising selecting the PSF, wherein said selecting the PSF comprises:
performing a table lookup using the detected distance measure to obtain a previously stored value, that in part defines the selected PSF, which is associated with a previously stored distance measure.

11. The machine-implemented method of claim 10 wherein the detected distance measure is qualitative.

12. The machine-implemented method of claim 10 wherein the detected distance measure is quantitative.

13. The method of claim 9 further comprising:
displaying captured images of the scene via an electronic viewfinder to a user, wherein said detecting a distance measure is in response to the user actuating a shutter button part-of-the-way while the scene is being displayed, and wherein said selecting a PSF applying the selected PSF is in response to the user actuating the shutter button all-of-the-way.

14. The machine-implemented method of claim 9 further comprising selecting the PSF from a plurality previously stored PSFs, based on the detected distance measure.

15. A portable media device comprising:
a handheld media device housing having integrated therein RF circuitry coupled to an antenna,
a digital camera image sensor,
a lens system to form on the image sensor an optical image of a scene, the image sensor to capture an image of the scene,
a distance/proximity sensor to detect a distance measure being a measure of distance between the sensor and an object in the scene,
a processor coupled to the image sensor, the distance/proximity sensor, and the RF circuitry, and
memory coupled to the processor, wherein the memory stores instructions that when executed by the processor
a) activate digital camera functionality of the portable media device,
b) in response to actuation of a shutter button part-of-the-way, read the detected distance measure, enable a point spread function, PSF, if the detected distance measure indicates the object is near, and disable the PSF if the detected distance measure indicates the object is far,
c) in response to actuation of the shutter button all-of-the-way, apply the PSF to de-blur the captured image if the PSF is enabled, and d) manage a wireless telephone call made or received using the RF circuitry.

16. The portable media device of claim 15 wherein the memory stores a table of a plurality of different distance measures and respective PSF values for the lens system, and wherein the memory stores further instructions that when executed by the processor select the PSF by referring to the table using the detected distance measure.

17. The portable media device of claim 16 wherein the detected distance measure is quantitative.

18. The portable media device of claim 16 wherein the detected distance measure is qualitative.

19. The portable media device of claim 16 wherein the table comprises quantitative distance ranges and their respective PSF values.

20. The portable media device of claim 16 wherein the table comprises qualitative distance ranges and their respective PSF values.

21. The portable media device of claim 15 wherein the memory stores further instructions that when executed by the processor, in further response to actuation of a shutter button part-of-the-way, select the PSF from a plurality previously stored PSFs, based on the detected distance measure.

22. A portable media device comprising:
a handheld media device housing having integrated therein a digital camera image sensor,
a camera lens to form on the image sensor an optical image of a scene that is before the lens, the image sensor to capture an image of the scene,
a distance/proximity sensor to detect a distance measure, being a measure of distance between the housing and an object in the scene,
a processor coupled to the image sensor and the proximity sensor, and
a memory coupled to the processor, wherein the memory stores instructions that when executed by the processor a) enable application of a point spread function, PSF, when a camera macro mode is enabled, b) disable the PSF when when the camera macro mode is not enabled, and c) apply the PSF to de-blur the captured image if the PSF is enabled.

23. The portable media device of claim 22 wherein the memory stores a table of distance measures and their respective PSF values, and wherein the memory stores further instructions that when executed by the processor select the PSF by referring to the table using the detected distance measure.

24. The portable media device of claim 22 wherein the memory stores further instructions that when executed by the processor, select the PSF from a plurality previously stored PSFs, based on the detected distance measure.

25. A portable media device comprising:
a handheld media device housing having integrated therein RF circuitry coupled to an antenna,
a digital camera image sensor,
a lens system to form on the image sensor an optical image of a scene, the image sensor to capture an image of the scene,
a distance/proximity sensor to detect a distance measure being a measure of distance between the sensor and an object in the scene,
a processor coupled to the image sensor, the distance/proximity sensor, and the RF circuitry, and
memory coupled to the processor, wherein the memory stores instructions that when executed by the processor
a) activate digital camera functionality of the portable media device,
b) in response to actuation of a shutter button part-of-the-way, read the detected distance measure, enable a point spread function, PSF, when a camera macro mode is enabled, and disable the PSF when the camera macro mode is not enabled,
c) in response to actuation of the shutter button all-of-the-way, apply the PSF to de-blur the captured image if the PSF is enabled, and
d) manage a wireless telephone call made or received using the RF circuitry.

26. The portable media device of claim 25 wherein the memory stores a table of a plurality of different distance measures and respective PSF values for the lens system, and wherein the memory stores further instructions that when executed by the processor select the PSF by referring to the table using the detected distance measure.

27. The portable media device of claim 25 wherein the memory stores further instructions that when executed by the processor, in further response to actuation of a shutter button part-of-the-way, select the PSF from a plurality previously stored PSFs, based on the detected distance measure.

* * * * *